(12) United States Patent
Mahen et al.

(10) Patent No.: US 10,158,694 B1
(45) Date of Patent: Dec. 18, 2018

(54) METHOD AND APPARATUS FOR MODIFYING ASSET MANAGEMENT SOFTWARE FOR A MOBILE DEVICE

(71) Applicant: Total Resource Management, Inc., Alexandria, VA (US)

(72) Inventors: Andrew Joseph Mahen, Arlington, VA (US); Albert M. Johnson, Jr., Falls Church, VA (US)

(73) Assignee: Total Resource Management, Inc., Alexandria, VA (US)

( * ) Notice: Subject to any disclaimer, the term of this patent is extended or adjusted under 35 U.S.C. 154(b) by 467 days.

(21) Appl. No.: 14/945,826

(22) Filed: Nov. 19, 2015

(51) Int. Cl.
*G06F 15/16* (2006.01)
*H04L 29/08* (2006.01)
*G06F 3/0484* (2013.01)

(52) U.S. Cl.
CPC .......... *H04L 67/06* (2013.01); *G06F 3/04842* (2013.01)

(58) Field of Classification Search
CPC .................................... G06F 8/33; G06F 8/34
See application file for complete search history.

(56) References Cited

U.S. PATENT DOCUMENTS

| | | | |
|---|---|---|---|
| 7,392,210 B1 * | 6/2008 | MacKay | G06Q 10/06 705/35 |
| 8,843,890 B2 * | 9/2014 | Frenkiel | G06F 8/51 717/110 |
| 9,009,659 B2 | 4/2015 | Mahen | |
| 9,639,330 B2 * | 5/2017 | Cao | G06F 8/34 |
| 9,703,534 B2 * | 7/2017 | Ben-Tzur | G06F 17/30867 |
| 2002/0138545 A1 * | 9/2002 | Andreakis | G06F 8/61 709/200 |
| 2006/0130038 A1 * | 6/2006 | Claussen | G06F 9/4492 717/168 |
| 2006/0271390 A1 * | 11/2006 | Rich | G06F 8/20 717/100 |
| 2006/0293934 A1 * | 12/2006 | Tsyganskiy | G06F 8/72 705/7.29 |
| 2007/0124403 A1 * | 5/2007 | Umezawa | H04L 12/1822 709/206 |
| 2008/0086701 A1 * | 4/2008 | Stokes | G06F 3/0481 715/808 |
| 2009/0182750 A1 * | 7/2009 | Keyes | G06F 8/60 |
| 2009/0288078 A1 | 11/2009 | Makonahalli | |
| 2009/0326884 A1 | 12/2009 | Amemiya | |
| 2010/0010791 A1 | 1/2010 | Anerousis | |
| 2010/0217784 A1 * | 8/2010 | Carter | G06F 17/30734 707/805 |
| 2011/0029767 A1 | 2/2011 | Ayachitula | |

(Continued)

*Primary Examiner* — Shean Tokuta
(74) *Attorney, Agent, or Firm* — Mei & Mark LLP

(57) ABSTRACT

A method for adding a selected attribute to a mobile asset management application is provided. The method includes displaying an import fields dialog to a user, receiving from the user a selection of a selected object of an asset database, receiving from the user a selection of the selected attribute of the selected object, retrieving a set of one or more resources, automatically modifying a build file if at least a first condition is met, automatically acquiring a new RDF file from an asset management server if at least a second condition is met, and automatically generating an updated application definition file by updating code relating to the set of retrieved resources.

20 Claims, 8 Drawing Sheets

(56) References Cited

U.S. PATENT DOCUMENTS

| | | | |
|---|---|---|---|
| 2011/0035391 A1* | 2/2011 | Werner | G06F 17/30731 707/756 |
| 2011/0213508 A1 | 9/2011 | Mandagere | |
| 2011/0252163 A1* | 10/2011 | Villar | G06F 17/5027 710/16 |
| 2012/0059684 A1 | 3/2012 | Hampapur | |
| 2012/0066268 A1* | 3/2012 | Kirkby | G06Q 10/00 707/803 |
| 2012/0084560 A1 | 4/2012 | Jayaraman | |
| 2012/0089933 A1* | 4/2012 | Garand | G06F 8/38 715/765 |
| 2012/0095797 A1 | 4/2012 | Nishimura | |
| 2012/0095926 A1 | 4/2012 | Nishimura | |
| 2012/0124478 A1* | 5/2012 | King | G06F 17/30943 715/738 |
| 2012/0215543 A1* | 8/2012 | Oz | G06F 3/167 704/275 |
| 2012/0227028 A1* | 9/2012 | Pun | G06F 8/38 717/108 |
| 2012/0296685 A1 | 11/2012 | Nishimura | |
| 2012/0297445 A1 | 11/2012 | Nishimura | |
| 2012/0316906 A1 | 12/2012 | Hampapur | |
| 2013/0132929 A1* | 5/2013 | Weller | G06F 8/70 717/113 |
| 2013/0179761 A1* | 7/2013 | Cho | G06F 17/21 715/202 |
| 2013/0318160 A1* | 11/2013 | Beraka | H04L 67/104 709/204 |
| 2014/0006333 A1* | 1/2014 | Ognyanov | G06N 5/04 706/51 |
| 2014/0250424 A1* | 9/2014 | Johnson, Jr. | G06F 8/33 717/113 |
| 2015/0242297 A1 | 8/2015 | Johnson | |
| 2016/0085877 A1* | 3/2016 | Achyutuni | G06F 17/30896 715/234 |
| 2016/0188302 A1* | 6/2016 | Fredrick | G06F 8/34 717/107 |
| 2017/0060542 A1* | 3/2017 | Mandal | G06F 9/4488 |
| 2017/0123761 A1* | 5/2017 | Childs | G06F 8/33 |
| 2017/0123763 A1* | 5/2017 | Childs | G06F 8/33 |
| 2017/0206065 A1* | 7/2017 | Ben-Tzur | G06F 8/20 |

* cited by examiner

METHOD AND APPARATUS FOR MODIFYING ASSET MANAGEMENT SOFTWARE FOR A MOBILE DEVICE

TECHNICAL FIELD

This application relates to methods and apparatuses for modifying asset management software for a mobile device, specifically where source code for the software comprises multiple interdependent component files.

BACKGROUND

Enterprise asset management software is used by entities to operate, maintain, and manage enterprise assets. Such software products, such as Maximo® and Maximo® Anywhere by IBM®, provide for the management of assets across multiple departments, locations, facilities, and business units for businesses and other entities. Additional software products, such as Worklight® and MobileFirst by IBM® permit asset management activities to be performed via mobile devices, such as smart phones and tablets; this supports businesses and other entities by allowing for the management of assets by employees, contractors, customers, agents, or other individuals who are in the field. However, as asset management software is often designed to be useful for a broad range of entities and industries, such software may lack specific features that may be beneficial or necessary for certain entities. As a result, application programming interfaces may be available to interact with or modify the software or its associated data, and may be used by an entity to develop additional functionality of the software.

However, due to the complicated nature of asset management software and the storage and maintenance of related assets, developing such functionality may be exceedingly difficult. In particular, the writing of scripts and programming code to interact with the asset management software may present a high level of difficulty to users. This may be especially true with respect to modifying mobile asset management software applications (e.g., in the Eclipse Development Environment for Maximo Anywhere), where multiple interdependent source code component files, as well as asset management server and asset database data, may need to be edited in such a way as to maintain working interdependencies before the modified mobile application can be built and/or used. For example, modifying mobile asset management software applications may require making parallel changes in multiple files. This may be difficult, time-consuming, and likely to result in errors when attempting to build component source code files into a mobile asset management software application. Thus, there is a perceived need for software and related apparatuses that provide users with an integrated development environment (IDE) for modifying mobile asset management software applications without the requirement of manually updating multiple interdependent source code component files. That is, it would be is desirable to have an IDE program that automatically updates appropriate component source code files with a single button deployment or other simplified interface.

Additional information can be found in U.S. Patent Publication No. 2015/0242297, entitled "Method and System for Testing of Applications in Asset Management Software"; U.S. Pat. No. 9,009,659, entitled "Method and System for Displaying Context-Based Completion Values in an Integrated Development Environment for Asset Management Software"; U.S. Patent Publication No. 2012/0316906, entitled "Spatial-Temporal Optimization of Physical Asset Maintenance"; U.S. Patent Publication No. 2012/0297445, entitled "Method of Managing Asset Associated with Work Order or Element Associated with Asset, and System and Computer Program for the Same"; U.S. Patent Publication No. 2012/0296685, entitled "Method of Managing Access Right, and System for Computer Program for the Same"; U.S. Patent Publication No. 2012/0095926, entitled "Method of Managing Asset Associated with Work Order or Element Associated with Asset, and System and Computer Program for the Same"; U.S. Patent Publication No. 2012/0095797, entitled "Method of Managing Access Right, and System and Computer Program for the Same"; U.S. Patent Publication No. 2012/0084560, entitled "Reboot Controller to Prevent Unauthorized Reboot"; U.S. Patent Publication No. 2012/0059684, entitled "Spatial-Temporal Optimization of Physical Asset Maintenance"; U.S. Patent Publication No. 2011/0213508, entitled "Optimizing Power Consumption by Dynamic Workload Adjustment"; U.S. Patent Publication No. 2011/0029767, entitled "System and Method for Transforming Configuration Data Items in a Configuration Management Database"; U.S. Patent Publication No. 2010/0010791, entitled "System and Method for Constructing Flexible Ordering to Improve Productivity and Efficiency in Process Flows"; U.S. Patent Publication No. 2009/0326884, entitled "Techniques to Predict Three-Dimensional Thermal Distributions in Real-Time"; and U.S. Patent Publication No. 2009/0288078, entitled "Method and Apparatus for Deploying Applications," all of which are herein incorporated by reference in their entirety.

SUMMARY

The present disclosure provides a description of algorithmic methods, apparatuses, and systems to address the perceived need described above.

In one embodiment, a method for adding a selected attribute to a mobile asset management application is provided. The method includes displaying an import fields dialog to a user, receiving from the user a selection of a selected object of an asset database, receiving from the user a selection of the selected attribute of the selected object, retrieving a set of one or more resources, automatically modifying a build file if at least a first condition is met, automatically acquiring a new RDF (Resource Description Framework) file from an asset management server if at least a second condition is met, and automatically generating an updated application definition file by updating code relating to the set of retrieved resources.

In another embodiment, the step of retrieving the set of resources includes receiving from the user a selection of a first resource of an existing application data file, and retrieving the first resource.

In yet another embodiment, the step of retrieving the set of resources further includes determining whether the first resource is a main resource of the existing application definition file. If the first resource is not the main resource, the main resource linked with the first resource from the existing application definition file is automatically retrieved.

In yet another embodiment, the step of retrieving the set of resources further includes determining whether the selected object is a main object of the object structure of the asset database that is associated with the main resource, determining whether the selected object has a relationship with the main object in the existing application definition file if the selected object is not the main object; automatically retrieving a second resource of the existing application definition file that is associated with the main object if the selected object is not the main object but is related to the main object in the existing application definition file; and, if the selected object is not the main object and is not related to the main object in the existing application definition file, creating a third resource, linking the third resource with the main resource, and retrieving the third resource.

In yet another embodiment, the step of retrieving a set of resources includes determining a first resource associated with the selected object and retrieving the main resource linked to the first resource.

In yet another embodiment, the step of modifying the build file, if at least a first condition is met, includes determining if the selected object is included in any existing RDF file associated with an existing application definition file and updating code of the build file if the selected object is not included in any existing RDF file associated with the existing application definition file.

In yet another embodiment, the step of automatically acquiring a new RDF file from an asset management server, if at least a second condition is met, includes determining whether the selected attribute is included in any existing RDF file associated with the existing application definition file, determining whether the attribute is included in an exclusion table if the selected attribute is not included in any existing RDF file, and downloading the new RDF file from the asset management server only if the selected attribute is not included in any existing RDF file associated with the existing application definition file and the attribute is not included in the exclusion table.

In yet another embodiment, the step of automatically acquiring a new RDF file from an asset management server, if at least a second condition is met, further includes sending a resyncing signal to the asset management server prior to downloading the new RDF file.

In yet another embodiment, the step of automatically acquiring a new RDF file from an asset management server, if at least a second condition is met, further includes displaying an error message to the user if the attribute is included in the exclusion table.

In yet another embodiment, the method further includes determining whether the selected object is part of an object structure of the asset database that is associated with at least one resource of the set of resources, and instructing the asset management server to update the asset database to include the selected object in the object structure if the selected object is not part the object structure.

In yet another embodiment, the method further includes receiving input from the user regarding a relationship between the selected object and a main object of the object structure if the selected object is part of the object structure.

In yet another embodiment, the method further includes determining whether the selected object is part of an object structure of the asset database that is associated with at least one resource of the set of resources, and displaying an error message to the user if the selected object is not part of the object structure.

In yet another embodiment, the method further includes determining whether a cache is up to date, updating the cache if it is not up to date, and building a list from the cache.

In yet another embodiment, the step of updating the data cache further includes generating and sending a query to the asset management server, receiving data from the asset management server, updating the cache with the received data.

In yet other embodiments a non-transitory computer readable storage medium storing a computer program is provided. When executed by a computer, the computer program performs the respective method embodiments listed above.

It is to be understood that both the foregoing general description and the following detailed description are exemplary and explanatory only and are not restrictive of the invention as claimed.

BRIEF DESCRIPTION OF THE DRAWINGS

The accompanying drawings, which are incorporated in and constitute a part of this specification, illustrate several embodiments and aspects of the apparatuses and methods described herein and, together with the description, serve to explain the principles of the invention.

DETAILED DESCRIPTION

Figure 1:
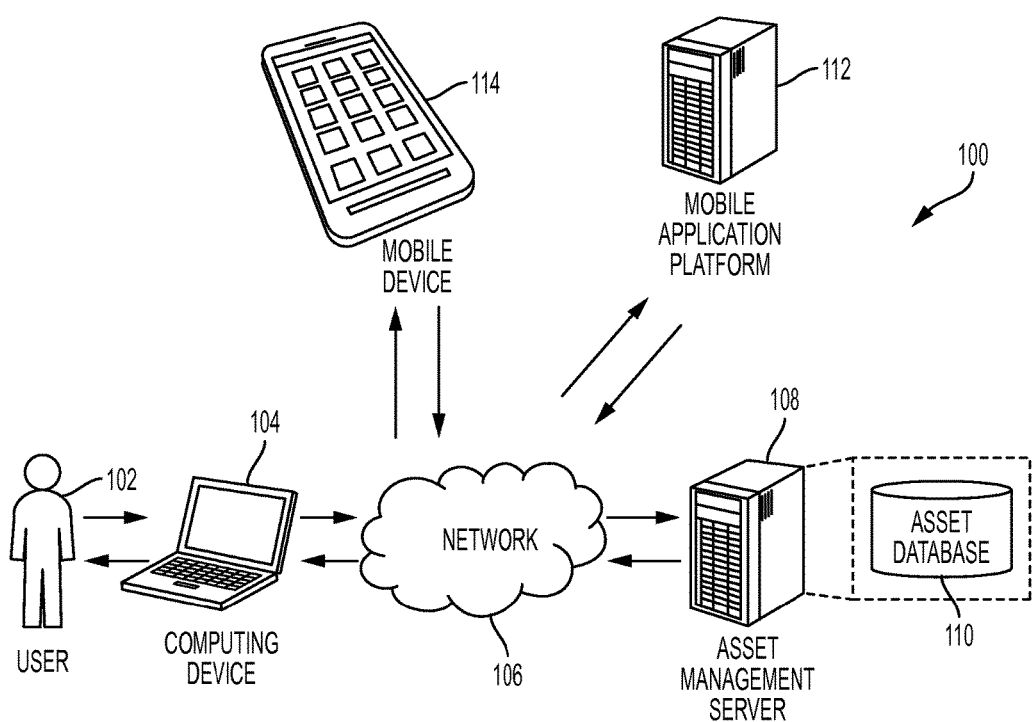
FIG. 1 is a high level architecture diagram illustrating a system for modifying mobile asset management software applications in an integrated development environment in accordance with exemplary embodiments.

FIG. 1 illustrates an asset management system 100, which is also a system for providing an integrated development environment for modifying a mobile asset management software application, in accordance with embodiments of this disclosure.

The system 100 may include a user 102. The user 102 may use a computing device 104 to access an integrated development environment. The computing device 104, discussed in more detail below, may be any type of computing device suitable for performing the functions and algorithms disclosed herein such a desktop computer, laptop computer, notebook computer, tablet computer, smartphone, etc. The integrated development environment (IDE) may be executed by the computing device 104 and may include one or more editors configured to enable the user 102 to enter text, such as for a script or program code. The integrated development environment (IDE) and any associated editor may be a part of, may utilize, may communicate via, or may otherwise be associated with an application programming interface (API) configured to interface with asset management software.

The computing device 104 may be connected to a network 106. The network 106 may be any type of network suitable for performing the functions as disclosed herein as will be apparent to persons having skill in the relevant art, such as a local area network, a wide area network, the Internet, etc.

The system 100 may also include an asset management server 108. As understood by persons skilled in the art, the asset management server 108 (e.g., a Maximo asset management server) may be a computing server configured to store and execute asset management software. The asset management server 108 may include or otherwise access an asset database 110. An asset database 110 may be configured to store data, assets, and other information associated with the asset management software of the asset management server 108. An asset database 110 may store one or more sets of data assets. Each data asset set may include data tables comprising one of more object structures, as well as of objects that are not part of an object structure. Each object structure may include a plurality of objects nested in a hierarchy, such that a given object may have relationships with one or more higher level objects such as a parent object, a grandparent object, a great-grandparent object etc. Additionally, a given object may have relationships with one or more lower level objects including, for example, one or more child objects, one or more of grandchild objects, etc. Each object structure has a single main object, which is the highest level object for that object structure. A main object has no parent object. Each object may have one or more attributes, which are data fields that pertain to an object. A set of assets may also include an exclusion table, which lists attributes that are not permitted to be provided to a mobile device 114.

The asset management server 108 may control and update the database, maintaining the organization of the database. As known by persons of skill in the art, the asset management server 108 may also generate files that are ultimately used to build mobile asset management software applications, such as RDF files. Each object in the object structure may have a corresponding RDF file, which, via a listing of one or more URLs, maps the location(s) of relevant attribute and/or object data within the asset database. The computing device 104 may communicate with the asset management server 108 via the network 106.

The computing device 104 may access data stored in the asset database 110 via an API configured to communicate with the asset management server 108. As discussed in more detail below, the computing device 104 may retrieve data stored in the asset database 110 of the asset management server 108 by communicating with the asset management server 108. The asset management server 108 may execute instructions provided by computing device 104. Executing these instructions may include responding to queries from the computing device 104 and updating the asset database 110. The asset management server 108 may maintain data that defines the object structure of a set of assets.

The system 100 may include one or more mobile devices 114 running one or more mobile asset management software applications. The mobile device 114 may be a smart phone, tablet, smart watch, portable computer, or the like.

The system 100 may include a mobile application platform 112 (e.g., a WorkLight® or MobileFirst asset management server) to support mobile asset management. Each mobile device 114 may communicate with mobile application platform 112 via the network 106. The mobile application platform 112 may communicate with asset management server via the network 106. As facilitated by a mobile asset management software application, each mobile device 114 may receive and update data within asset database 110 by communicating with the mobile application platform 112, which in turn communicates with asset management server 108, which in turn may access and/or modify data within asset database 110. As is known in the art, for each mobile asset management software application supported, the mobile application platform 112 may maintain a repository file, typically a .WAR file, to guide this integrated communication. A mobile asset management software application may be installed on a mobile device 114 via an application bundle, commonly known as a ZIP file, which typically has one of the following extensions: .APK, .IPA or .WLAPP. The ZIP file is provided to the mobile device 114 by the mobile application platform 112 via network 106. The mobile application platform 112 may receive ZIP and repository files from computing device 104 via network 106, as directed by a user 102.

In some embodiments, the asset management server 108 may also include a license compliance review tool. The license compliance review tool may be configured to retrieve stored data from the asset database 110, such as data associated with a license associated with the user 102 and/or computing device 104. In some instances, the data may be retrieved using a series of SQL statements or other suitable methods for accessing data. The asset management server 108 may analyze the retrieved data to determine if the user 102, computing device 104, and/or mobile device 114 are in violation of one or more licenses associated with use of the data, software, hardware, and/or network, such as authorized, limited, express, or concurrent type licenses that may be issued.

Figure 2:
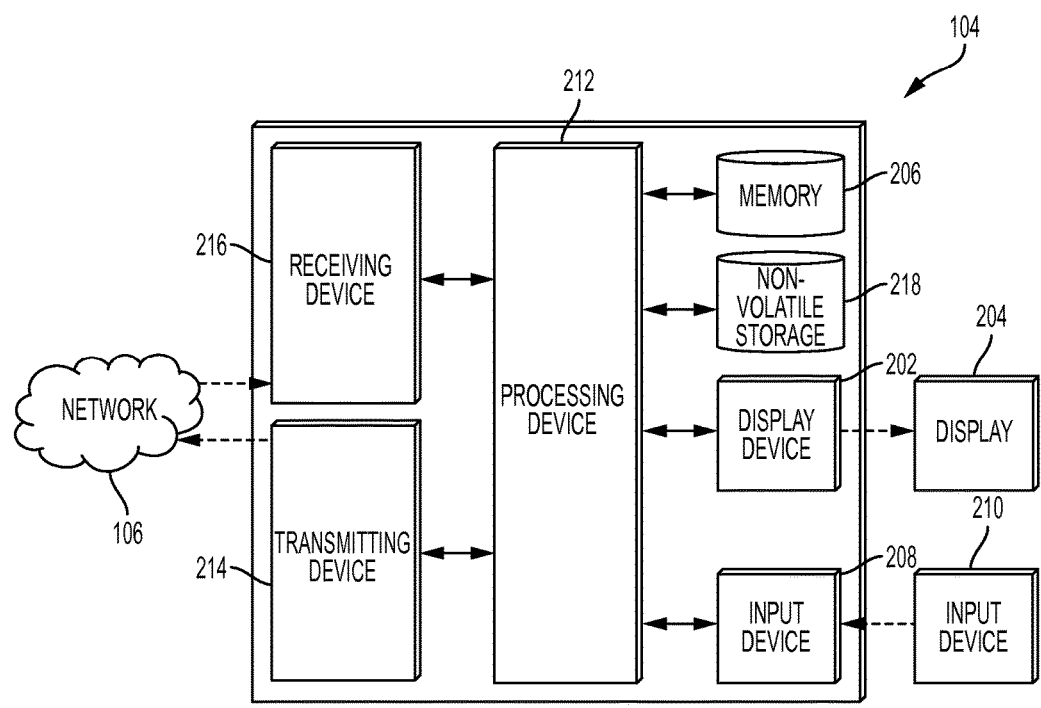
FIG. 2 is a block diagram illustrating the computing device of FIG. 1 in accordance with exemplary embodiments.

FIG. 2 illustrates an embodiment of the computing device 104 of system 100. It will be apparent to persons having skill in the relevant art that the embodiment of the computing device 104 illustrated in FIG. 2 is provided as illustration only and may not be exhaustive to all possible configurations of a computing device 104 suitable for performing the functions as discussed herein.

The computing device 104 may include a display device 202. The display device 202 may be configured to communicate and/or interface with a display 204 to display data to the user 102. The display 204 may be any type of display suitable for performing the functions disclosed herein, such as a liquid crystal display, light-emitting diode display, OLED display, touch screen display, capacitive touch display, etc. The display device 202 may be configured to transmit data to the display that is stored in a memory 206 of the computing device 104.

The computing device 104 may include non-volatile storage 218, which can store software and data, including an IDE program, and one or more local project folders, as well as other types of software and data that would be apparent to persons having skill in the relevant art. A stored IDE program may, in some embodiments, be a commercially available IDE program such as Eclipse in addition to a software plug-in, which may enable some or all of the algorithms and functionality of the present disclosure. The IDE program may be configured to allow for communication between computing device 104 and both the asset management server 108 and mobile application platform 112. The IDE may include one or more text-based and/or GUI editors suitable for enabling the user 102 to input text or select variables, such as resources, attributes, or objects to be included in the mobile asset management software; to modify an object structure; to revise, edit, or acquire component source code files; and/or make other modifications to mobile asset management software applications or corresponding sets of assets in an asset database 110.

Each local project folder may include mobile asset management application software, component source code files of such software, lists or copies of sets of assets from the database or parts thereof, build properties, and/or additional files that would be apparent to persons having skill in the relevant art.

A ZIP file and a repository file of a mobile asset management application may be built from component source code files. Component source code files of a mobile asset management application may include an application definition file (which may be known in the art as an app.xml file), one or more RDF files, and a build file (which may be known in the art as a build.xml file).

As is known in the art, application definition files include a plurality of resources. Similar to objects, the resources may be nested in a hierarchy, such that a given resource may have relationships with one or more higher level objects such as a parent resource, a grandparent resource, etc. Additionally, a given resource may have relationships with one or more lower level resources including, for example, one or more child resources, one or more of grandchild resources, etc. Each application definition file may have one or more main resource, which is a highest-level resource in an application definition file. A main resource has no parent resource. Each resource may have one or more app_attributes, which describe the resource. Each resource is properly mapped to a single object in the object structure; however, a single object may be mapped to one or more resources. Similarly, an app_attribute is properly mapped to a single attribute in the object structure; however, a single attribute may be mapped to one or more app_attribute. As known in the art, a build file provides build instructions as to how component source code files may be built into a ZIP file and a repository file of functional mobile asset management application. Because a corresponding RDF file is required for each object ultimately associated with a resource in an application definition file, a local project folder will typically include a plurality of existing RDF files.

Other component source code files may include .JS (Java script) files, which can be used to add functionality to the application definition file; .CSS (cascading style sheet) files, which can be used to change the appearance of the mobile application interface; and other source code file types apparent to persons having skill in the relevant art.

Lists or copies of assets may include tables of objects and attributes of the relevant asset set in the database, their respective relationships, the type of each attribute (e.g., Boolean, number, string, date, date-time, or duration) and/or additional data or metadata. They may be stored in a cache. The non-volatile storage may include a data cache of some or all of the relevant portion of the asset database 110 and/or an iteration of the object structure.

Build properties may include the URL of the relevant asset management server 108, the URL of the mobile application platform 112, and/or username(s) and password(s) and licenses needed for access.

Figure 6:
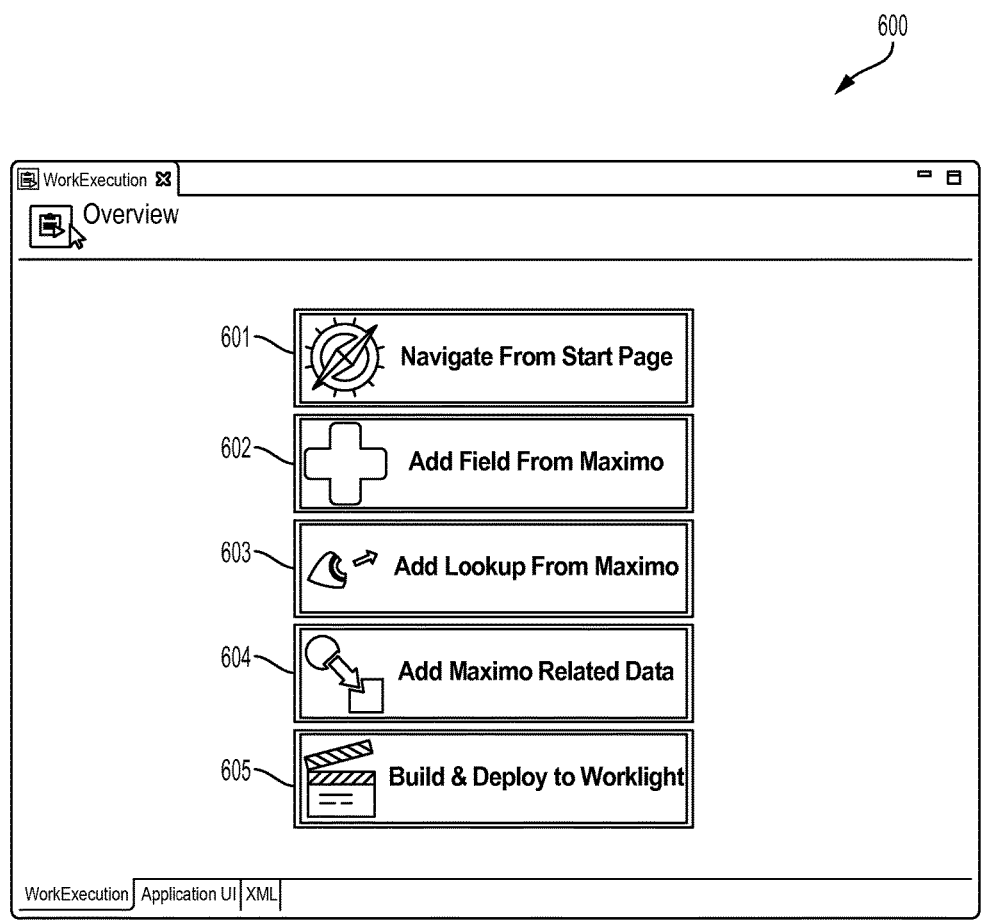
FIG. 6 is a diagram illustrating an overview screen of a graphical user interface in an integrated development environment in accordance with exemplary embodiments.
Figure 7:
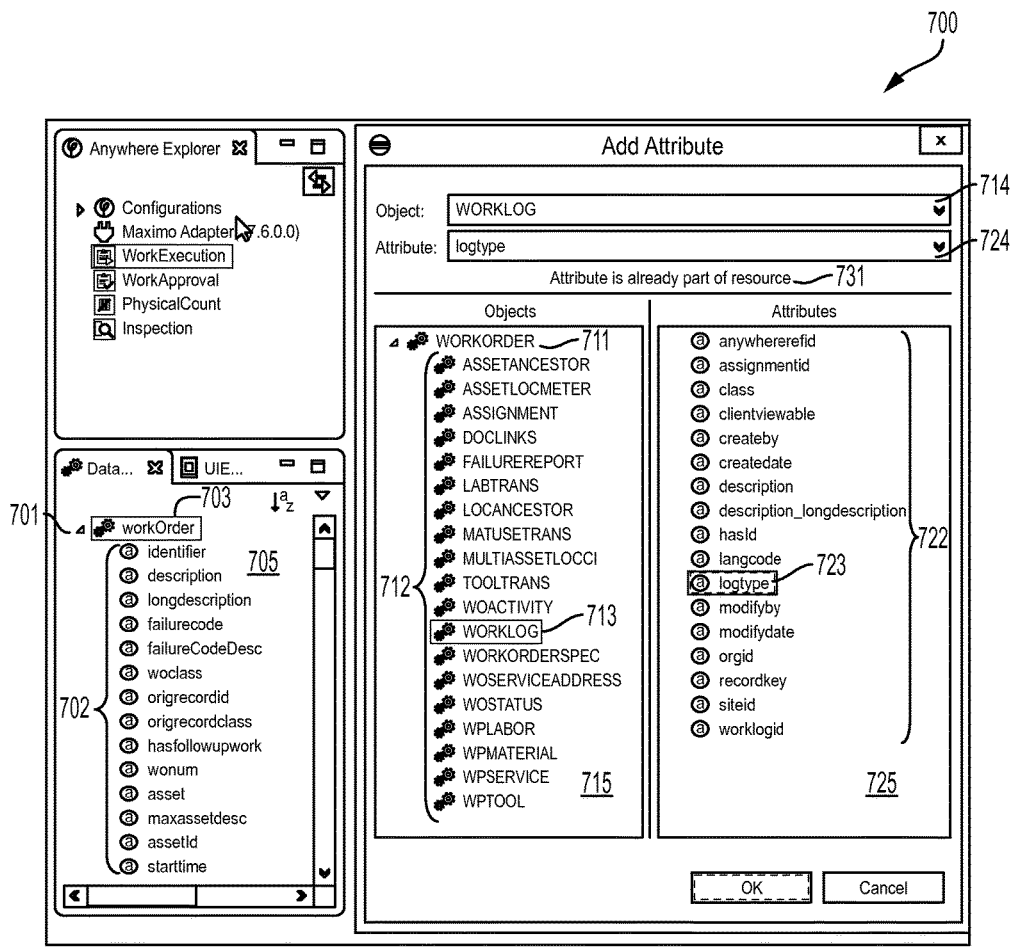
FIG. 7 is a diagram illustrating an import fields dialog of a graphical user interface in an integrated development environment in accordance with exemplary embodiments.
Figure 8:
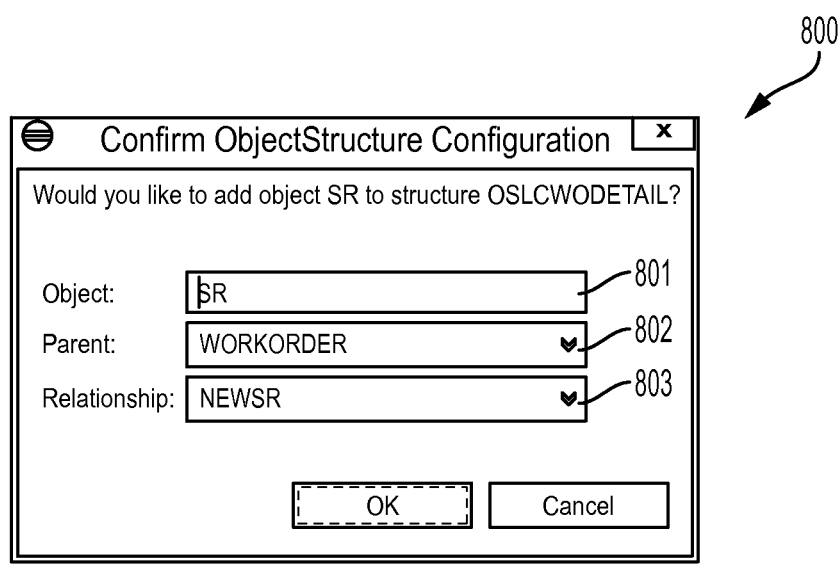
FIG. 8 is a diagram illustrating an object structure modification dialog of a graphical user interface in an integrated development environment in accordance with exemplary embodiments.

The display device 202 may be configured to display the IDE interface and appropriate data to the user 102, for example as shown in FIGS. 6-8. The display device 202 may also display a cursor position, which may allow a user 102 to select an option or a variable, use a dropdown menu, indicate a point of input for text or commands input by the user 102, and/or facilitate user communication in another fashion known to persons of skill in the art.

The computing device 104 may receive input from the user 102 via an input device 208. The user 102 may communicate with the input device 102 via an input interface 210 that is connected to or otherwise in communication with the input device 208. The input interface 210 may be any type of input suitable for performing the functions disclosed herein, such as a keyboard, mouse, touch screen, click wheel, scroll wheel, trackball, touch bad, input pad, microphone, camera, etc. In some embodiments, the input interface 210 and the display 204 may be combined, such as in a capacitive touch display. In some instances, the display 204 and/or the input interface 210 may be included in the computing device 104. In other instances, the display 204 and/or the input interface 210 may be external to the computing device 104.

The computing device 104 may further include a processing device 212. The processing device 212 may be a central processing unit (CPU) or other processor or set of processors suitable for performing the functions disclosed herein as will be apparent to persons having skill in the relevant art. The processing device 212 may receive data associated with input by the user 102, such as via the input device 208. The processing device 212 may also be configured to read data and software stored in non-volatile storage 218 and memory 206; write data and software stored in non-volatile storage 218 and memory 206; execute program code stored in the memory 206 or non-volatile storage 218, such as embodiments of the IDE program disclosed herein; communicate to other system 100 components on network 106 via receiving device 216 and transmitting device 214; and transmit data to the display device 202 for display to the user 102 via the display 204. The processing device 212 may be further configured to execute embodiments of the algorithms disclosed herein, as discussed in more detail below. Additional functions performed by the processing device 212 will be apparent to persons having skill in the relevant art and may also be discussed herein.

The memory 206 may store data suitable for performing the functions disclosed herein. Some or all of the data and software stored within non-volatile storage 218 may be copied to memory 206 to support the processing functions of processing device 212.

The computing device 104 may also include a transmitting device 214. The transmitting device 214 may be configured to transmit data over the network 106 via one or more suitable network protocols. The transmitting device 214 may transmit queries, login credentials, instructions, and data to the asset management server 108 over the network 106. The transmitting device 214 may transmit ZIP and repository files to the mobile application platform 112 over the network 106. Computing device 104 may also include a receiving device 216. The receiving device 216 may be configured to receive data over the network 106 via one or more suitable network protocols. The receiving device 216 may receive asset data and metadata, RDF files, exclusion list data, object structure data, and/or other data and commands from the asset management server 108 over the network 106. The receiving device 216 may receive various data and commands from the mobile application platform 112 over the network 106.

Figure 3:
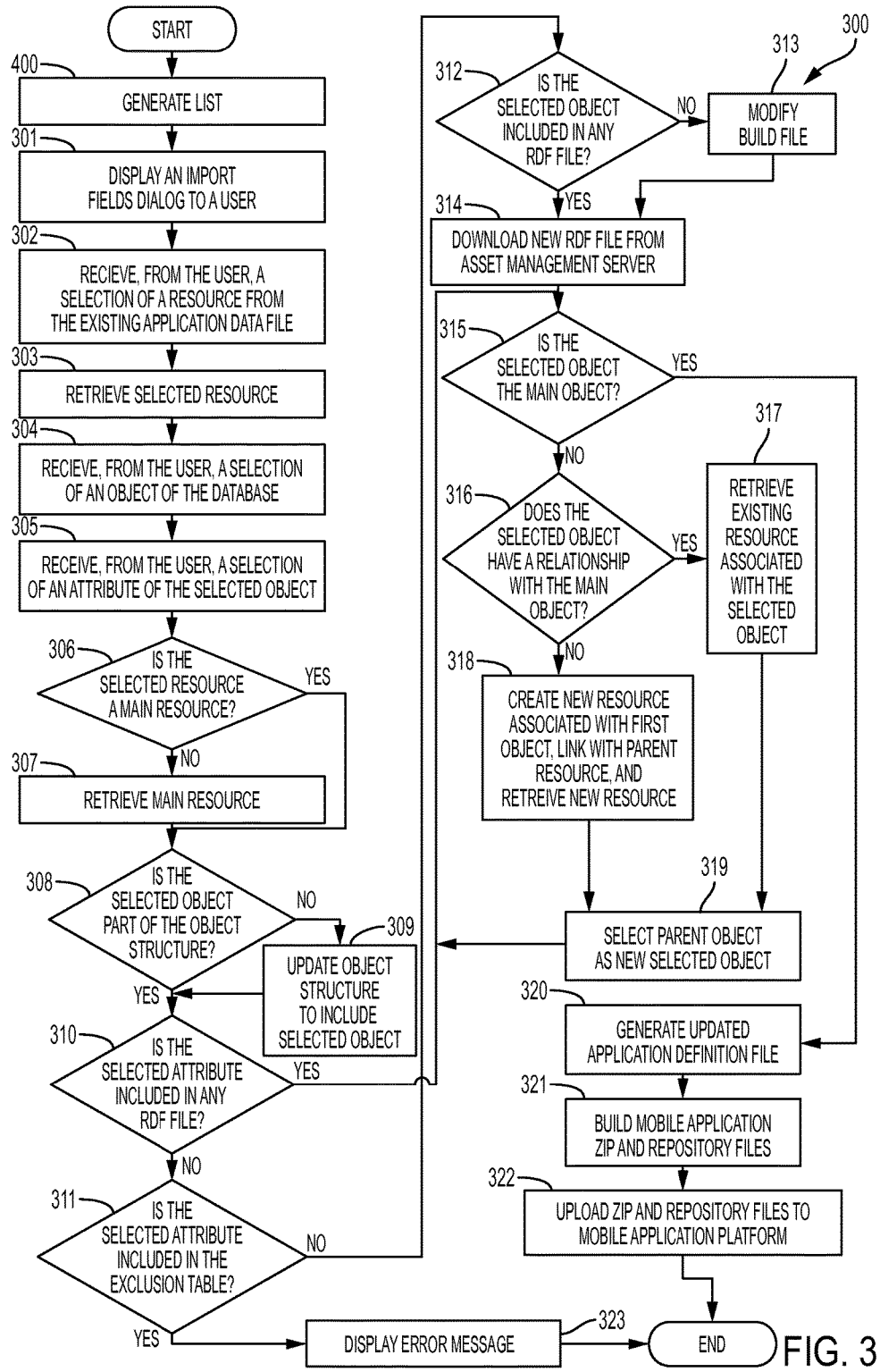
FIG. 3 is a flowchart of an example of an algorithm for updating a mobile asset management software application in accordance with exemplary embodiments.

FIG. 3 illustrates process 300, an embodiment of an algorithm for adding an attribute to a mobile asset management software application. The steps of this algorithm (as well as other related algorithms discussed herein) may be performed by a computing device 104, in concert with other elements of system 100. Software embodying the algorithms may be stored in non-volatile storage 218 and/or memory 206 and may be executed by a processing device 212. As would be apparent to persons of skill in the art, the exact order of certain steps of the disclosed algorithm embodiments may be altered while still practicing the disclosed algorithms. Similarly, certain steps of the disclosed algorithm embodiments may be substituted, combined, or removed while still practicing the disclosed algorithms—consistent with the disclosure herein and/or as would be apparent to persons of skill in the art.

To facilitate the starting of process 300, computing device 104 may display an overview screen 600, for example, as shown in FIG. 6. Screen 600, may include a number of options that the user may select, including navigate option 601, which provides the user access to a text editor of the IDE; add field option 602, which may be selected to add an attribute from the asset management server 108 to the mobile asset management software application; and build/deploy option 605, which may be selected to initiate steps 321 and 322 discussed below.

As in step 400, computing device 104 may generate or re-generate a list to be stored locally on computing device 104, preferably within the local project folder. The list may include all objects, attributes, relationships among the objects and attribute, and the type of each attribute (e.g., Boolean, number, string, date, date-time, duration, etc.) of the relevant asset set that are associated with resources and app_attributes of an existing application definition file. In some embodiments, the list may include associations between resources and objects. Step 400 of process 300 may be omitted in some embodiments, but it is preferably included as it makes certain steps of process 300 proceed more quickly: If the list is not locally available, computing device 104 may be required to repeatedly query asset management server 108 throughout process 300 to acquire relevant data, slowing the process.

Figure 4:
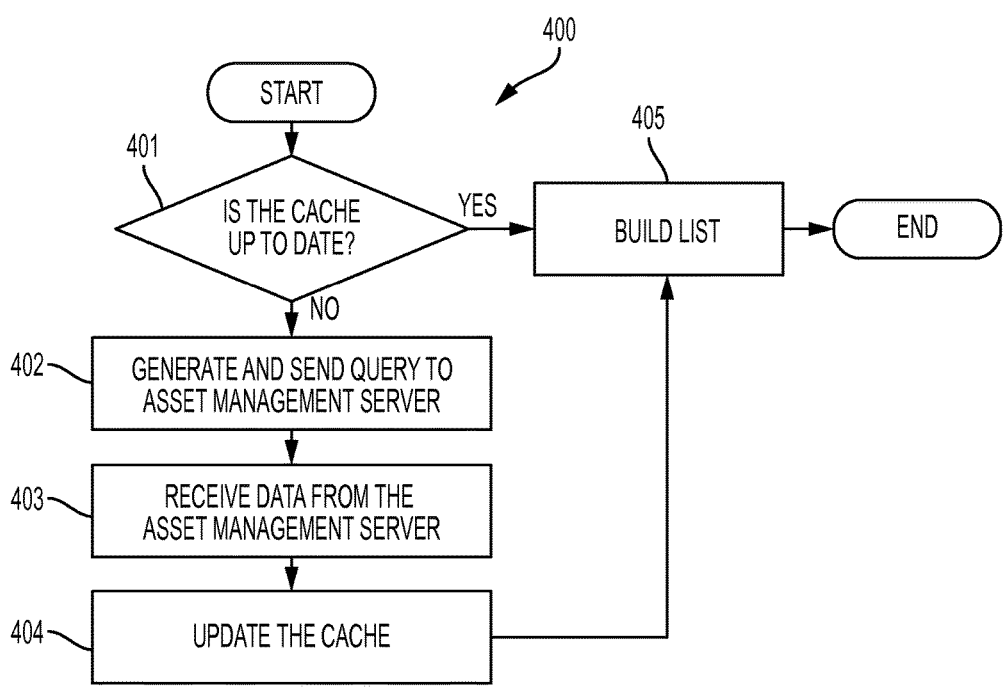
FIG. 4 is a flowchart of an example of an algorithm for generating a list of data in accordance with exemplary embodiments.

FIG. 4 illustrates process 400, an embodiment of an algorithm for generating the list, which may be step 400. As in step 401, the computing device 104 determines if there is an up to date data cache with relevant asset set data. If the cache is not up to date or does not exist, the process proceeds to step 402. If the cache is up to date, the process proceeds to step 405. In one embodiment, the computing device 104 checks how much time has passed since the last cache refresh to determine if the cache is up to date. For, example, the IDE program may be coded to find the cache to be out of date if a period of time, such as three days, has passed. As in step 402, the computing device 104 generates and sends a query to asset management server 108 to acquire updated data for the cache. The query may seek all objects, all attributes, relationships among them, and attribute types that are associated with resources and app_attributes of the existing application definition file. The query may incorporate an appropriate URL for the asset management server 108, as well as a user name and password and/or other build properties. As in steps 403 and 404, computing device 108 receives the queried data from the asset management server 108 and updates the cache with the new data, respectively. As in step 405, the computing device 104 builds the list from the cache, such that it may be used to facilitate process 300 and related processes. The list may be kept in memory 206 and/or non-volatile storage 218.

As in step 301, the computing device 104 displays an import fields dialog 700 to a user. FIG. 7 depicts an exemplary import fields dialog 700, which may be based upon data in the generated list. In alternative embodiments, the import fields dialog may be generated and/or re-generated from asset data directly received from the asset management server 108, but this approach may slow process 300. As shown, import fields dialog 700 includes resource selection area 705, object selection area 715, and attribute selection area 725. The import fields dialog may be a GUI similar or different from FIG. 7, or may be text-based import fields dialog.

As in step 302, the computing device 104 may receive, from the user, a selection of a resource from resources in the existing application data file. With reference to FIG. 7, import fields dialog 700 may display resources from the existing data file in resource selection area 705. Main resource 701 and child resources 702 are shown in this example. A user may select a resource by using a mouse or other input device 210. In this example, resource selection box 703 indicates that the user selected main resource 701 "workOrder" as the selected resource.

As in step 303, the computing device 104 may retrieve the selected resource from the application definition file. As would be understood by a person of skill in the art, retrieving a resource may comprise scanning the application definition file to find where the resource is defined, pulling out a line(s) of code pertaining to the resource, and saving such line(s) of the code and or/the location of such line(s) within the application definition file in memory 206 and/or non-volatile storage 208. The saved line(s) of code will be utilized when the updated application definition file is generated, as in step 320.

As in step 304, the computing device 104 may receive, from the user, a selection of an object of the asset database 110, which is preferably supplied from the generated list. With reference to FIG. 7, import fields dialog 700 may display objects in object selection area 715. Main object 711 and child objects 712 are shown in this example. A user may select an object by using a mouse or other input device 210. In this example, object selection box 713 indicates that the user selected child object 712 "WORKLOG" as the selected object. Also shown in this example, a user may alternatively select an object via object drop down menu 714, which may also display the selected object.

As in step 305, the computing device 104 may receive, from the user, a selection of an attribute of the selected object, which may be supplied from the generated list. With reference to FIG. 7, import fields dialog 700 may display attributes associated with the selected object from the existing data file in attribute selection area 725. A list of selectable attributes 722 of the selected object are shown in this example. A user may select an attribute by using a mouse or other input device 210. In this example, attribute selection box 723 indicates that the user selected attribute 722 "log-type" as the selected attribute. Also shown in this example, a user may alternatively select an attribute via attribute drop down menu 724, which may also display the selected attribute.

In certain preferred embodiments, an attribute indicator message 731 may notify a user 102 when a selected attribute (or provisionally selected attribute) is already part of a resource of the application definition file. This may be helpful to a user to prevent adding an attribute that already exists in the mobile asset management application, and therefore may be duplicated in the mobile asset management software application if selected and added. Additionally or alternatively, a subset of selectable attributes 722 may be marked with color or other indicator or a color that identifies the indicated attributes as already being part of a resource of the application definition file.

As in step 306, the computing device 104 may determine if the selected resource is a main resource. If the selected resource is not a main resource, the main resource of the selected resource is retrieved as in step 307.

As in step 308, the computing device 104 may determine if the selected object is part of the object structure of the asset database 110 that is associated with the main resource. In preferred embodiments, the computing device 104 may query the asset management server 108 to inquire about the relevant object structure associated with the selected resource, which may be defined by data in the asset management server 108. In other embodiments, the computing device 104 may query the asset database 110 via the asset management server 108 to acquire information about the relevant object structure. In yet other embodiments, the object structure may be included in the list generated in step 400. However, because only one object structure may be required, acquiring all available object structures in step 400 may unnecessarily slow down process 300. If the selected object is not part of the object structure the process proceeds to step 309. If the object is part of the object structure, the process proceeds to step 310.

As in step 309, the relevant object structure of the asset database 110 may be modified to appropriately include the selected object. Information regarding the selected object, including its parent object and the nature of its relationship with the parent object may be required before updating the object structure. FIG. 8 depicts an exemplary object structure modification dialog 800, which may be used to receive or confirm the required information from the user. As shown, object structure modification dialog 800 may include a selected object field 801, an object parent field 802, and a relationship field 803. Fields 802 and 803 may be drop down menus. For example, as depicted in FIG. 8, the selected child object is "SR," which may be an abbreviation for Service Request, and its parent object is "WORKORDER". The Relationship between the objects is "NEWSR," which may be an abbreviation for new service request, and is an attribute (or can be a set of attributes) of the selected object that associates it with its parent object. Once the required information is input from the user 102, the computing device 104 may then instruct the asset management server 108 to modify the asset database 110 to include the selected object as part of the relevant object structure.

In yet alternative embodiments of process 300, object structure modification may be forbidden. The computing device 104 may display an error message and end process 300 in lieu of step 309.

As in step 310, the computing device 104 may determine if the selected attribute is included in any existing RDF file in the local project folder. Here, it may be assumed that the selected object is included in an existing RDF file if the selected attribute is included in an RDF file. However, in alternative embodiments, this step 310 may determine whether both the selected attribute and the selected object are in an existing RDF file. If the selected attribute is included in an existing RDF file, the process proceeds to step 315. If not, the process proceeds to step 311

As in step 311, it is determined whether the selected attribute is included in an exclusion table of the asset database 110. The computing device 104 may query the asset management server 108 to request the exclusion table during this step. In alternative embodiments, an exclusion table may be received earlier in process 300 and, for example, may be included in the generated list of step 400. The computing device 104 may assess whether the selected attribute is included in the exclusion table. If the exclusion list includes the selected attribute, an error message is displayed, as in step 323 and process 300 is completed. If the selected attribute is not included in the exclusion table, the process proceeds to step 312.

As in step 312, the computing device 104 may determine if the selected object is included in any existing RDF file in the local project folder. If the selected object is included in an existing RDF file, no build file changes will be necessary as the RDF file corresponding to selected object will merely be replaced; the process proceeds to step 314. If, however, the selected object is not included in any existing RDF file, a wholly new RDF file corresponding to the selected object will be required, and the build file must be modified; the process proceeds to step 313.

Step 313 modifies the build file when appropriate, as determined by step 312. It may be noted that the build file will always be updated when the object structure is updated as in step 309. The build file may be modified by finding an appropriate place to insert code and then inserting code necessary to incorporate the wholly new RDF file to be downloaded in step 314. To find a place to insert code, the computing device 104 may, for example, search for a line of code in the build file that matches the name of the object structure, which may have been acquired in step 308. For example, a search query that includes the object structure name may be sued. As would be apparent to a person of skill in the art, the code to be inserted may be constructed from the name of the wholly new RDF file to be created and a path to where the RDF file will be downloaded and/or maintained, preferably in the local project folder. In exemplary embodiments, the name of the new RDF will comprise the object structure name and the selected object name.

As in step 314, the computing device 104 downloads a new RDF file from the asset management server 108. Prior to downloading the new RDF file, the computing device 104 may send a syncing signal to the asset management server 108 to ensure that all RDF files on asset management server 108 are refreshed with respect to any changes in the asset database 110. If, in step 312, the selected object was included in an existing RDF file, the new RDF file will replace the existing RDF file where the selected object was included. If, in step 312, the selected object was not included in an existing RDF file, the existing RDF files may be maintained.

As in step 315, it is determined whether the selected object is the main object of the object structure assessed in step 306. If the selected object is the main object—which is necessarily associated with the main resource retrieved in either step 303 or 307, then it is known that all relevant resources have been retrieved; the process proceeds to step 320. If the selected object is not the main object, then additional resources may need to be retrieved such that all resources associated with the selected objected, its parent object, and any grandparent object, etc. are retrieved; the process proceeds to step 316.

As in step 316, it is determined whether the selected object has a relationship with the main object in the application definition file. In other words, step 316 asks whether the selected object is mapped to a resource that is nested below the main resource associated with the main object of the selected object. Unless the object structure was updated in step 309, the answer to step 316's question will typically be yes. If the answer is yes, the existing resource associated with the selected object is retrieved, as in step 317. If that resource was already retrieved, for example in step 303 or 307, it is not a problem if the same resource is retrieved again in step 317. Then, as in step 319, the parent object of the selected object becomes the selected object and step 315 is repeated such that resources associated with the original selected objected, its parent object, and any grandparent object, etc. are retrieved. Steps 315-319 may loop one or more times.

If in step 316, it is determined that the selected object does not have a relationship with the main object, then it may be assumed that there is no existing resource associated with the selected object. As in step 318, a new resource is created, associated with the selected object, linked to the main resource, and retrieved. Then, as in step 319, the parent of the selected object becomes the selected object and step 315 is repeated such that all resources associated with the original selected objected, its parent object, and any grandparent object, etc. are retrieved, looping as necessary.

As in step 320, the computing device 104 generates an updated application definition file by adding code in the existing application definition file pertaining to the retrieved resources. The location(s) where the code may be added is dictated by the retrieved resources. A line of code pertaining to app_attribute corresponding to the selected attributed may be added at the end of the defined resource to which the app_attribute pertains. As would be apparent to a person of skill in the art, the line of code added may include the selected attribute name, a unique character string, and additional information pulled from the new RDF file, including a uniform resource identifier (URI). In preferred embodiments, the unique character string may be the current time or date-time, with granularity to the milliseconds). In more complicated cases, for example where a new resource was created and retrieved in step 318, code comprising a new resource definition pertaining to the new resource may be added at the end of the definition of the retrieved parent resource of the new resource.

In preferred embodiments, the IDE program may return to an overview screen 600, for example as shown in FIG. 6, after step 320. This would allow a user to make additional changes to the mobile asset management application, such as adding a second attribute to the mobile asset management software application, prior to building and deploying it.

Step 321 may begin upon a user selecting build/deploy option 605. As in step 321, the computing device 104 may build the mobile application ZIP and repository files from the updated application definition files, the build file, and the RDF files, as well as any relevant .JS, .CSS, and relevant source code files. Because the disclosed algorithm consistently modifies, as appropriate, the interdependent application definition file, RDF files, and build file, building the mobile application ZIP and repository files should proceed without any build errors.

Finally, as in step 322, the computing device 104 may upload the built ZIP and repository files to mobile application platform 112 so that the mobile asset management software may be distributed to mobile devices 114 and operated.

Figure 5:
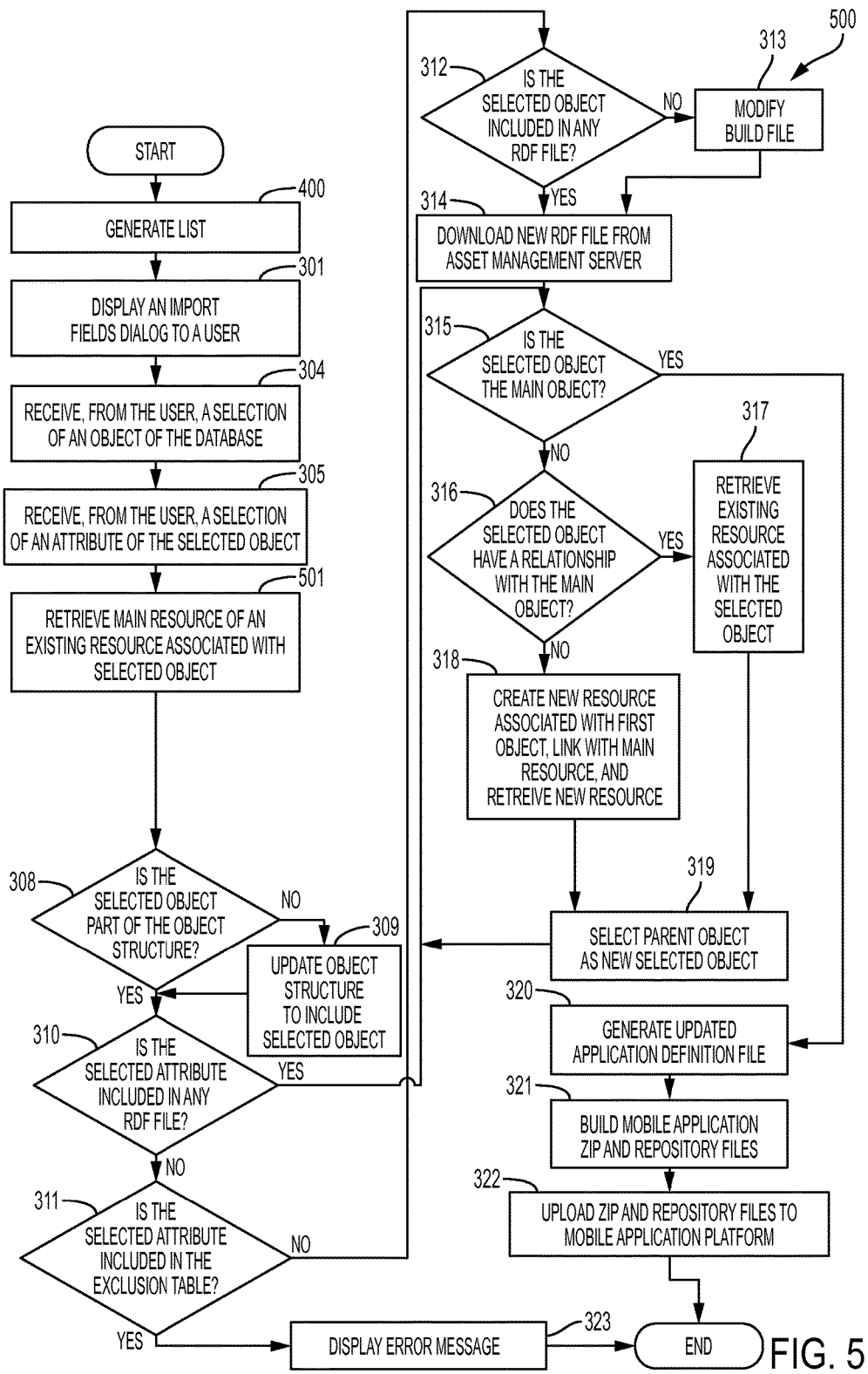
FIG. 5 is a flowchart of another example of an algorithm for updating a mobile asset management software application in accordance with exemplary embodiments.

FIG. 5 illustrates process 500, which is an alternative embodiment of an algorithm for adding an attribute to a mobile asset management software application. Process 500 is substantially similar to process 300, except that instead of a user selecting a resource, the IDE program automatically selects the main resource of an existing resource associated with an object selected by the user, as in step 501. Steps 302, 302, 306, and 307 are omitted. While an IDE employing process 500 may be easier for a user to operate than an IDE employing process 300, there may be an increased possibility of error because there may be multiple resources associated with the selected object. In one embodiment, if there are multiple resources associated with the selected object, the main resource of the first resource listed in the existing application definition file that is associated with the selected object is retrieved. In another embodiment, a user may be given the opportunity to select a resource from a possible plurality of resources associated with the selected object; the main resource of that selected resource is retrieved.

Although the foregoing embodiments have been described in detail by way of illustration and example for purposes of clarity of understanding, it will be readily apparent to those of ordinary skill in the art in light of the description herein that certain changes and modifications may be made thereto without departing from the spirit or scope of the appended claims. It is also to be understood that the terminology used herein is for the purpose of describing particular aspects only, and is not intended to be limiting, since the scope of the present invention will be limited only by the appended claims.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only," and the like in connection with the recitation of claim elements, or use of a "negative" limitation. As will be apparent to those of ordinary skill in the art upon reading this disclosure, each of the individual aspects described and illustrated herein has discrete components and features which may be readily separated from or combined with the features of any of the other several aspects without departing from the scope or spirit of the disclosure. Any recited method can be carried out in the order of events recited or in any other order that is logically possible. Accordingly, the preceding merely provides illustrative examples. It will be appreciated that those of ordinary skill in the art will be able to devise various arrangements which, although not explicitly described or shown herein, embody the principles of the disclosure and are included within its spirit and scope.

Furthermore, all examples and conditional language recited herein are principally intended to aid the reader in understanding the principles of the invention and the concepts contributed by the inventors to furthering the art, and are to be construed without limitation to such specifically recited examples and conditions. Moreover, all statements herein reciting principles and aspects of the invention, as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the present invention, therefore, is not intended to be limited to the exemplary configurations shown and described herein.

In this specification, various preferred embodiments have been described with reference to the accompanying drawings. It will be apparent, however, that various other modifications and changes may be made thereto and additional embodiments may be implemented without departing from the broader scope of the claims that follow. The specification and drawings are accordingly to be regarded in an illustrative rather than restrictive sense.

We claim:

1. A method of adding a selected attribute to a mobile asset management application, comprising:
  displaying an import fields dialog to a user;
  receiving from the user a selection of a selected object of an asset database;

receiving from the user a selection of the selected attribute of the selected object;

retrieving a set of one or more resources;

automatically modifying a build file, when at least a first condition is met;

automatically acquiring a new Resource Description Framework (RDF) file from an asset management server, when at least a second condition is met; and automatically generating an updated application definition file by updating code relating to the set of retrieved resources, wherein the step of automatically acquiring a new RDF file from an asset management server, when at least a second condition is met, comprises:

determining whether the selected attribute is included in any existing RDF file associated with the existing application definition file; when the selected attribute is not included in any existing RDF file, determining whether the attribute is included in an exclusion table; and downloading the new RDF file from the asset management server only when the selected attribute is not included in any existing RDF file associated with the existing application definition file and the attribute is not included in the exclusion table.

2. The method of claim 1, wherein the step of retrieving the set of resources comprises:

receiving from the user a selection of a first resource of an existing application data file; and retrieving the first resource.

3. The method of claim 2, wherein the step of retrieving the set of resources further comprises:

determining whether the first resource is a main resource of an existing application definition file; and when the first resource is not the main resource, automatically retrieving the main resource linked with the first resource from the existing application definition file.

4. The method of claim 3, wherein the step of retrieving a set of resources further comprises:

determining whether the selected object is a main object of an object structure of the asset database that is associated with the main resource;

when the selected object is not the main object, determining whether the selected object has a relationship with the main object in the existing application definition file;

when the selected object is not the main object but is related to the main object in the existing application definition file, automatically retrieving a second resource of the existing application definition file that is associated with the main object; and when the selected object is not the main object and is not related to the main object in the existing application definition file, creating a third resource, linking the third resource with the main resource, and retrieving the third resource.

5. The method of claim 1, wherein the step of retrieving a set of resources comprises:

determining a first resource associated with the selected object; and retrieving a main resource linked to the first resource.

6. The method of claim 1, wherein the step of modifying the build file, when at least a first condition is met, comprises:

determining when the selected object is included in any existing RDF file associated with an existing application definition file; and updating code of the build file when the selected object is not included in any existing RDF file associated with the existing application definition file.

7. The method of claim 1, wherein the step of automatically acquiring a new RDF file from an asset management server, when at least a second condition is met, further comprises:

sending a resyncing signal to the asset management server prior to downloading the new RDF file.

8. The method of claim 1, wherein the step of the step of automatically acquiring a new RDF file from an asset management server, when at least a second condition is met, further comprises:

displaying an error message to the user when the attribute is included in the exclusion table.

9. The method of claim 1, further comprising:

determining whether the selected object is part of an object structure of the asset database that is associated with at least one resource of the set of resources; and instructing the asset management server to update the asset database to include the selected object in the object structure when the selected object is not part the object structure.

10. The method of claim 9, further comprising:

receiving input from the user regarding a relationship between the selected object and a main object of the object structure when the selected object is part of the object structure.

11. The method of claim 1, further comprising:

determining whether the selected object is part of an object structure of the asset database that is associated with at least one resource of the set of resources; and displaying an error message to the user when the selected object is not part of the object structure.

12. The method of claim 1, further comprising:

determining whether a cache is up to date; updating the cache when it is not up to date; and building a list from the cache.

13. The method of claim 12, wherein the step of updating the data cache comprises:

generating and sending a query to the asset management server; receiving data from the asset management server; and updating the cache with the received data.

14. A non-transitory computer readable storage medium storing a computer program, which when executed by a computer, performs the following steps:

displaying an import fields dialog to a user;

receiving from the user a selection of a selected object of an asset database; receiving from the user a selection of the selected attribute of the selected object; retrieving a set of one or more resources;

automatically modifying a build file, when at least a first condition is met;

automatically acquiring a new Resource Description Framework (RDF) file from an asset management server, when at least a second condition is met; and automatically generating an updated application definition file by updating code relating to the set of retrieved resources, wherein the step of automatically acquiring a new RDF file from an asset management server, when at least a second condition is met, comprises:

determining whether the selected attribute is included in any existing RDF file associated with the existing application definition file; when the selected attribute is not included in any existing RDF file, determining whether the attribute is included in an exclusion table; and downloading the new RDF file from the asset management server only when the selected attribute is not included in any existing RDF file associated with the existing application definition file and the attribute is not included in the exclusion table.

15. The non-transitory computer readable storage medium of claim 14, wherein the step of modifying the build file, when at least a first condition is met, comprises:
determining when the selected object is included in any existing RDF file associated with an existing application definition file; and
updating code of the build file when the selected object is not included in any existing RDF file associated with the existing application definition file.

16. The non-transitory computer readable storage medium of claim 14, wherein the step of automatically acquiring a new RDF file from an asset management server, when at least a second condition is met, further comprises:
displaying an error message to the user when the attribute is included in the exclusion table.

17. The non-transitory computer readable storage medium of claim 14, wherein computer program, when executed by a computer, further performs the steps of:
determining whether the selected object is part of an object structure of the asset database that is associated with at least one resource of the set of resources; and
instructing the asset management server to update the asset database to include the selected object in the object structure when the selected object is not part the object structure.

18. The non-transitory computer readable storage medium of claim 17, wherein computer program, when executed by a computer, further performs the steps of:
receiving input from the user regarding a relationship between the selected object and a main object of the object structure when the selected object is part of the object structure.

19. The non-transitory computer readable storage medium of claim 14, wherein computer program, when executed by a computer, further performs the steps of:
determining whether the selected object is part of an object structure of the asset database that is associated with at least one resource of the set of resources; and
displaying an error message to the user when the selected object is not part of the object structure.

20. The non-transitory computer readable storage medium of claim 14, wherein computer program, when executed by a computer, further performs the steps of: determining whether a cache is up to date; updating the cache when it is not up to date; and building a list from the cache.

\* \* \* \* \*